J. J. C. SMITH.
Cutlery.

No. 219,416. Patented Sept. 9, 1879.

Attest:
Geo. T. Smallwood Jr.
Walter Allen

Inventor:
John J. C. Smith
By Knight Bros
attys

UNITED STATES PATENT OFFICE

JOHN J. CHARLES SMITH, OF COLLEGE POINT, NEW YORK, ASSIGNOR TO COLLEGE POINT RUBBER COMPANY, (LIMITED,) OF SAME PLACE.

IMPROVEMENT IN CUTLERY.

Specification forming part of Letters Patent No. 219,416, dated September 9, 1879; application filed February 12, 1879.

*To all whom it may concern:*

Be it known that I, JOHN JOSEPH CHARLES SMITH, of College Point, in the county of Queens and State of New York, (formerly of Somerville, Massachusetts,) have invented a certain new and useful Improvement in Cutlery, of which the following is a specification.

My invention consists in molding the handle of a table knife or fork, or other article of cutlery, in plastic material, with a metallic screw-nut within it embedded in the substance of the plastic handle in the act of molding the latter and receiving the tang of the blade, which tang, being properly threaded, is screwed into the nut, and there fixed by a transverse pin.

In order that my invention may be fully understood, I will proceed to describe it with reference to the accompanying drawings, in which—

Figure 1:
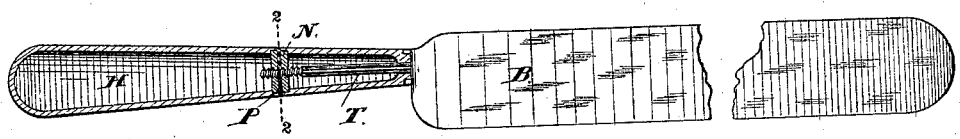
Figure 2:
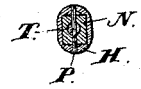

Figure 1 is a longitudinal section of the handle, illustrating the application of the invention to the manufacture of table-knives. Fig. 2 is a transverse section on the line 2 2, Fig. 1.

H represents the plastic material of the handle; N, the metallic screw-nut embedded therein in the process of molding the handle; B, the blade of the knife; T, its threaded tang, and P the transverse pin by which the tang is prevented from turning within the nut N and handle H after it has been screwed home.

The preferred mode of molding the plastic handle is made the subject of a separate application for Letters Patent.

Having thus described my invention, the following is what I claim as new therein and desire to secure by Letters Patent:

1. The combination of a handle made in one piece of plastic material and a nut embedded within said handle in the process of molding the latter, as set forth.

2. The combination of the handle H, of plastic material, the nut N, embedded therein in the process of molding the handle, the screw-tang T, and the pin P, substantially as and for the purposes set forth.

J. J. C. SMITH.

Witnesses:
CHAS. H. G. METZGER,
FERDINAND MARTENS.